Patented Oct. 15, 1935

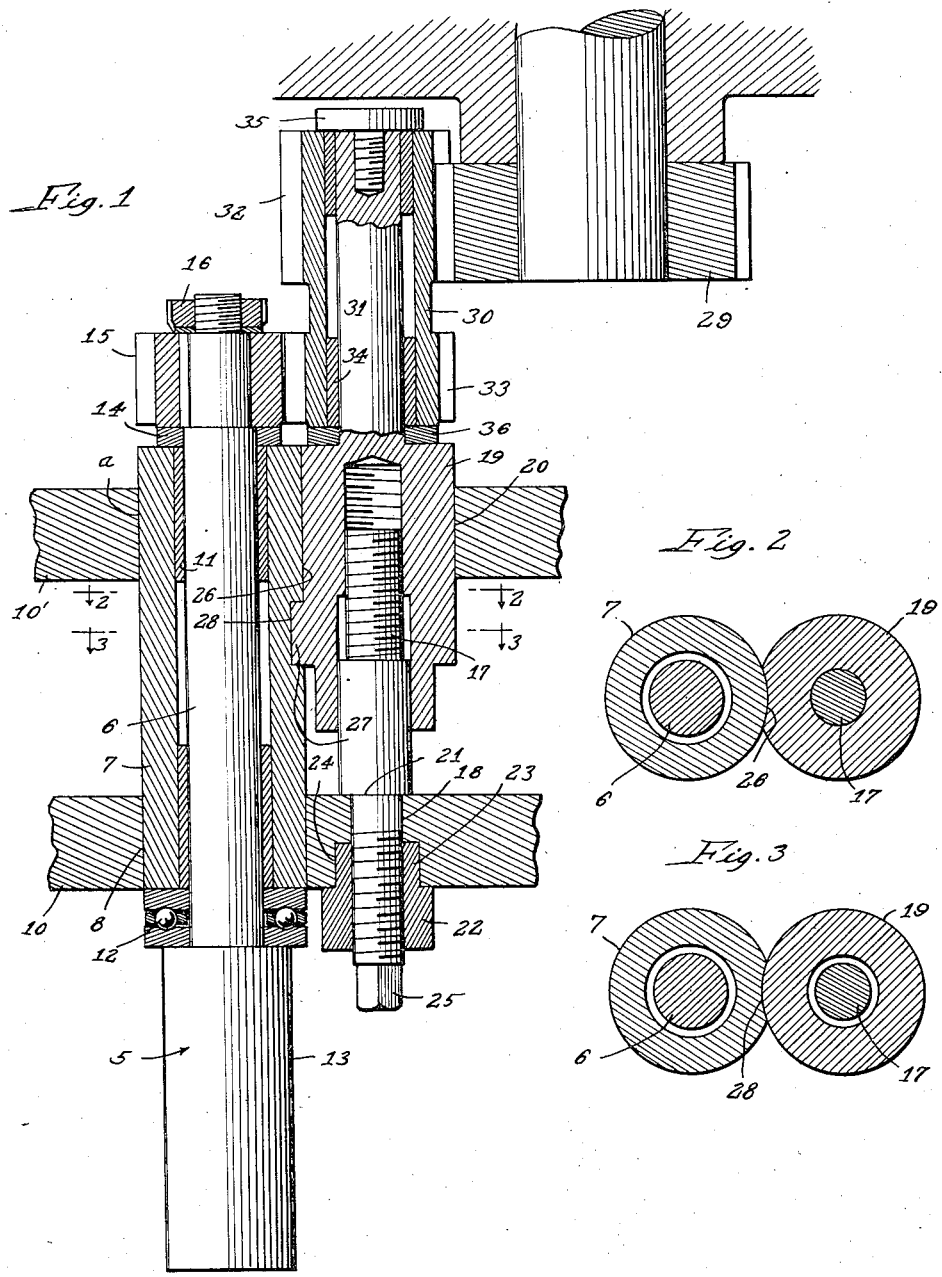

2,017,527

UNITED STATES PATENT OFFICE 2,017,527

SPINDLE UNIT FOR MULTIPLE SPINDLE MACHINES

Raymond A. Carlson, Rockford, Ill., assignor, by mesne assignments, to Borg-Warner Corporation, Chicago, Ill., a corporation of Illinois Application October 20, 1933, Serial No. 694,451

5 Claims. (Cl. 77—24)

This invention relates to a spindle unit suitable for multiple spindle machines ranging from light drilling and tapping machines to the larger drilling and tapping machines, as well as light and heavy duty boring machines.

The principal object of my invention is to provide a unit spindle, that is to say, a spindle with an intermediate drive shaft and the necessary gearing, as a self-contained unit, the same to be available in the stationary or adjustable types, depending upon the work for which the machine is designed.

Another important object of the invention is to provide a spindle unit, the construction of which permits easy removal and insertion on the face plate and thus enables the machine tool buyer to reduce his machine tool cost in changing from one design to another of his product.

The invention is illustrated in the accompanying drawings, in which—

Figure 1 is a longitudinal section through a unit spindle embodying my invention;

Figs. 2 and 3 are cross-sections on the correspondingly numbered lines of Figure 1.

Figure 4:
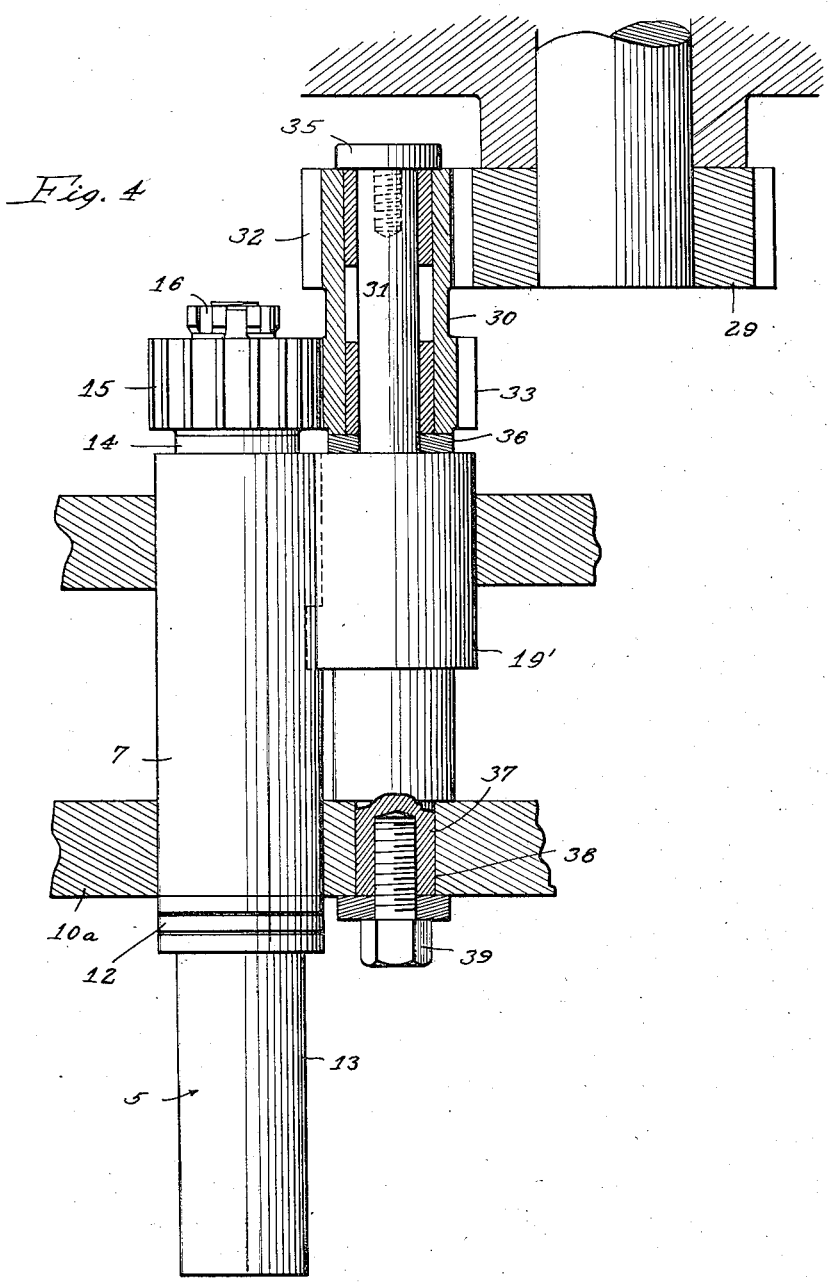
Fig. 4 is a showing similar to Figure 1 but of a modified form, Figure 1 being an adjustable type spindle and Fig. 4 a stationary or non-adjustable type. Similar reference numerals are applied to corresponding parts throughout the views.

Referring first to Figures 1–3, the numeral 5 is applied to a spindle which is one of a set for a multiple spindle machine. Reference has been made to adjustable and stationary or non-adjustable spindles; adjustability is most commonly required on multiple spindle drilling machines to compensate for wear of the ends of the drills on the spindles, but it should be understood that the invention is not limited to use on drilling machines, inasmuch as it is capable of use on a large variety of machine tools having the same or similar requirements so far as the spindles and spindle mountings are concerned. Furthermore, it will be evident that it is immaterial whether the spindles are vertical, horizontal, or otherwise.

The shank 6 of the spindle is received in a holder in the form of a sleeve 7 slidable in registering holes 8 and 9 in the outer and inner walls 10 and 10' of the face plate, commonly referred to as the cluster plate because of the projection therethrough of a cluster of spindles. The holder 7, as will soon appear, forms a part of the spindle adjustment. The spindle has its shank 6 received in bushings 11 provided in the opposite ends of the holder 7, and an anti-friction thrust bearing 12 is interposed between the outer end of the holder 7 and the enlarged projecting end 13 of the spindle, in which the socket for the drill or other tool is provided. The spindle is held against end play in the holder by means of a washer 14, gear 15 and nut 16. The gear is keyed on the end of the shank 6 and a lock washer is provided in connection with the nut 16 to prevent loosening.

An adjusting screw having screw threads at both ends has its one screw-threaded end mounted for rotation in a hole 18 in the outer wall 10 of the face plate and has its other screw-threaded end threading in a sleeve 19 slidably received in a hole 20 provided in the inner wall 10' of the face plate. The sleeve constitutes an elongated nut for the screw. The shoulder 21 on the screw 17 having abutment with the inside of the outer wall 10 prevents outward movement of the screw, and a nut 22 threading on the outer end of the screw 20 has a reduced cylindrical shank portion 23 fitting in a counterbore 24 in the hole 18 so as to hold the screw against endwise movement in the other direction when the nut is tightened. The nut is turned in a clockwise direction for tightening and when tightened prevents turning of the screw from an adjusted position. However, when the screw is to be adjusted, a quarter turn or so on the nut 22 in a counter-clockwise direction will be sufficient to enable turning the screw by application of a wrench or other tool on the squared outer end 25. Turning of the screw 17 in a clockwise direction results in outward movement of the sleeve 19, and, conversely, counter-clockwise direction of the screw causes inward movement of the sleeve. The endwise movement of the sleeve in one direction or the other is transmitted to the spindle 5 through its holder 7 with which the sleeve 19 is interlocked, as shown in Figs. 2 and 3. The interlocking or interfitting of parts 7 and 19 is facilitated by having the holes 9 and 20 intersecting, thus bringing the holder 7 and sleeve 19 in direct abutment and permitting connecting the same to hold the parts against turning as well as providing for the transmission of endwise movement from the sleeve 19 to the holder 7 in the adjustment of the screw 17. The sleeve 19 is milled off on one side on a radius equal to the radius of the holder 7, lengthwise thereof from the inner end of the sleeve part way to the outer end thereof as indicated at 26 (Fig. 2), thus providing a channel in which the side of the holder 7 is received. The interfitting of the parts in this way naturally prevents the sleeve 19 from turning. A lug 27 is defined at the inner end of the sleeve, where the recess 26 terminates, and this lug is received in a recess 28 milled in the side of the holder 7 on a radius equal to the radius of the sleeve 19 (Fig. 3). Thus, the holder 7 is also held against turning and the parts 7 and 19 are interconnected for the endwise adjustment of the spindle in the turning of the screw 17. The spindle adjustment just described forms the subject matter of my copending Patent No. 1,948,507 issued Feb. 27, 1934.

In accordance with the present invention, each spindle has a fairly direct gear drive connection with a driven gear 29, through an intermediate gear member 30 mounted on an axial extension 31 provided on the sleeve 19, said gear member having one toothed portion 32 meshing with the gear 29 and another toothed portion 33 meshing with the gear 15 keyed to the spindle. There is sufficient elongation of the toothed portion 32 to allow the full range of spindle adjustment without affecting the driving connection with the gear 29. The gear 30 is shown mounted on bushings 34 on the extension 31 but it will, of course, be understood that needle or roller type bearings might be employed both at 34 and 11, or, if desired, tapered roller bearings or ball bearings might be employed. The gear 30 is shown as retained on the extension 31 by a cap screw 35, with a washer 36 to assume end thrust between the gear and the main enlarged portion of the sleeve 19.

The operation of the invention should be clear from the foregoing description. Adjustment of the spindle can be accomplished simply by loosening the nut 22 and turning the screw 17 by means of the squared end 25, whereupon the nut 22 can again be tightened to keep the parts set in the new position. The adjustment does not affect the driving connection between the spindle and the driver 29. The sleeve 19 forming the elongated nut for the adjustment also constitutes the axle for the intermediate gear constituting the idler between the driver 29 and the spindle gear 15, so that it is manifest that the idler is given adequate support and there is absolutely no danger of vibration and noisy operation and certainly no possibility whatever of the spindle becoming disconnected from its driver. In other words, the construction affords a positive spindle drive and one that still permits easy adjustment of the spindle as desired. Furthermore, the construction permits easy removal and insertion of a spindle so that the machine tool buyer is enabled to reduce his machine tool costs in changing from one design to another of his product, which, of course, usually requires a change in the number or arrangement of spindles, or both. The intermediate gearing also gives an opportunity for getting most any desired gear ratio between 15 and 29 so that different spindle speeds can be provided for easily. While the gear teeth 32 and 33 are shown as on the same radius, it will, of course, appear that a difference in number of teeth could be provided for if the occasion arose; in other words, the idler might be made to serve as a step-up or step-down gear, instead of relying solely upon the ratio between the gears 15 and 29. Since each spindle is a separate compact unit it follows that the purchaser can have a certain number on hand for use as occasion presents itself, and he simply drills a face plate and inserts spindles in whatever arrangement the particular job calls for. The compact unit construction also adapts the spindle to use in a large variety of designs of machine tools, whereas most other spindles require specially designed face plates.

The construction disclosed in Fig. 4 is substantially the same as that in Figure 1, but in this case the part 19' is not adjustable but simply has its reduced end 37 entered in a hole 38 in the outer wall 10a of the face plate so as to lock the holder 7 relative to the face plate when the screw 39 is threaded in the reduced portion 37, as shown. There are certain kinds of work which do not require an adjustable spindle and it is for such purposes that this design is suited. The design offers all of the other advantages referred to in connection with the discussion of Figures 1–3.

It is believed the foregoing description conveys a good understanding of the objects and advantages of my invention. The appended claims have been drawn with a view to covering all legitimate modifications and adaptations.

I claim:

1. In a spindle unit, a driving shaft carrying a driving gear on the end thereof, a face plate in spaced relation to said gear, a spindle rotatably mounted in a holder slidably received in a hole provided in the face plate, said spindle projecting from the front of said plate and being disposed with its inner end in a plane spaced from the aforesaid gear so that the spindle can be disposed in any position of orientation relative to said gear and adjusted endwise to a certain extent toward and away from the plane of said gear, said holder having a retaining part alongside the same also slidably received in another hole provided in the face plate and movable endwise with the holder, means operable from in front of the face plate to adjust said holder and related part endwise relative to the face plate and the aforesaid gear, said retaining part having an inward extension reaching to the plane of the aforesaid gear, a gear rotatably mounted on said extension and meshing with the aforesaid gear in all positions of normal adjustment of said holder and retaining part, and another gear driven by the second gear and mounted on the inner end of the spindle to transmit drive to the latter.

2. In a spindle unit, a driving shaft carrying a driving gear on the end thereof, a face plate in spaced relation to said gear, a spindle rotatably mounted in a holder slidably received in a hole provided in the face plate, whereby to permit endwise adjustment of the spindle and also permit removal of the spindle and holder endwise from the face plate, said spindle projecting from the front of said plate and being disposed with its inner end in a plane spaced from the aforesaid gear so that the spindle can be disposed in any position of orientation relative to said gear and adjusted endwise to a certain extent toward and away from the plane of said gear, the holder having a laterally projecting part slidably and removably received in another hole provided in the face plate alongside the first hole, means operable from in front of the face plate to adjust said holder and related part endwise relative to the face plate and the aforesaid gear, an axial extension on the last mentioned part projecting inwardly with respect to the face plate into the plane of the aforesaid gear, a gear member rotatably mounted on the axial extension and having one set of gear teeth in meshing engagement with the aforesaid driving gear, said teeth being elongated sufficiently to maintain meshing engagement with the driving gear through a predetermined range of adjustment of the spindle unit, and a gear on the inner end of the spindle in constant meshing engagement with another set of gear teeth on the gear member.

3. In a spindle unit, a driving shaft carrying a driving gear on the end thereof, a face plate in spaced relation to said gear, a spindle projecting through the face plate with its inner end disposed in a different plane from the aforesaid gear so that the spindle can be disposed in any position of orientation relative to said gear and adjusted endwise to a certain extent toward and away from the plane of said gear, said face plate having two circular holes provided therein intersecting one another, a spindle holder of circular cross-section slidably and removably received in one of said holes, a sleeve of circular cross-section slidably and removably received in the other hole, the sleeve and holder being conformed with respect to one another each with an arcuate cutout portion adjacent an uncut portion of the other so as to hold the sleeve and holder against turning and prevent endwise movement of the sleeve with respect to the holder while providing a quickly detachable connection therebetween, an adjusting screw mounted for rotation on the face plate while held against endwise movement with respect thereto and threading in said sleeve to communicate endwise adjustment to the sleeve and holder, an axial extension on the sleeve projecting inwardly with respect to the face plate into the plane of the aforesaid gear, a gear member rotatably mounted on said axial extension and meshing with the aforesaid gear, and another gear on the inner end of the spindle driven by said gear member.

4. A structure as set forth in claim 3 wherein the gear member has one set of gear teeth in constant meshing engagement with the spindle gear, and has another set of gear teeth intended for meshing engagement with the driving gear.

5. A structure as set forth in claim 3 wherein the gear member has one set of gear teeth in constant meshing engagement with the spindle gear, and has another set of gear teeth intended for meshing engagement with the driving gear, the last mentioned gear teeth being elongated so as to maintain meshing engagement with the driving gear throughout a predetermined range of spindle adjustments.

RAYMOND A. CARLSON.